(12) United States Patent
Palmer et al.

(10) Patent No.: US 11,853,558 B2
(45) Date of Patent: Dec. 26, 2023

(54) POWER DOWN WORKLOAD ESTIMATION

(71) Applicant: Micron Technology, Inc., Boise, ID (US)

(72) Inventors: David A. Palmer, Boise, ID (US); Jonathan S. Parry, Boise, ID (US); Reshmi Basu, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/718,386

(22) Filed: Apr. 12, 2022

(65) Prior Publication Data

US 2023/0214126 A1 Jul. 6, 2023

Related U.S. Application Data

(60) Provisional application No. 63/295,359, filed on Dec. 30, 2021.

(51) Int. Cl.
*G06F 3/06* (2006.01)
(52) U.S. Cl.
CPC .......... *G06F 3/0617* (2013.01); *G06F 3/0653* (2013.01); *G06F 3/0679* (2013.01)

(58) Field of Classification Search
CPC ..... G06F 3/0617; G06F 3/0653; G06F 3/0679
See application file for complete search history.

(56) References Cited

U.S. PATENT DOCUMENTS

| 9,921,635 | B2 * | 3/2018 | Eckert .................. G06F 1/3231 |
| 10,776,698 | B2 | 9/2020 | Knittel |
| 2019/0236445 | A1 | 8/2019 | Das |
| 2019/0318246 | A1 | 10/2019 | Chen |
| 2020/0356860 | A1 | 11/2020 | Kim |

* cited by examiner

*Primary Examiner* — Gurtej Bansal
(74) *Attorney, Agent, or Firm* — Brooks, Cameron & Huebsch, PLLC

(57) ABSTRACT

Apparatuses and methods can be related power down workload estimations using artificial neural networks. Workload estimation can include predicting a duration of a subsequent power down event of the memory device. A quantity of maintenance operations to be performed on the memory device, may be predicted based on the predicted duration of the subsequent power down event, when the memory device is powered on after the subsequent power down event using an artificial neural network. The quantity of maintenance operations may be performed on the memory device prior to the subsequent power down event of the memory device.

20 Claims, 10 Drawing Sheets

POWER DOWN WORKLOAD ESTIMATION

PRIORITY INFORMATION

This application claims benefit of U.S. Provisional Application No. 63/295,358, filed Dec. 30, 2021, the contents of which are incorporated herein by reference.

TECHNICAL FIELD

The present disclosure relates generally to electronic memory apparatuses and methods, and more particularly to apparatuses and methods associated with power down workload estimation using artificial neural networks.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others.

Memory is also utilized as volatile and non-volatile data storage for a wide range of electronic applications. including, but not limited to personal computers, portable memory sticks, digital cameras, cellular telephones, portable music players such as MP3 players, movie players, and other electronic devices. Memory cells can be arranged into arrays, with the arrays being used in memory devices.

DETAILED DESCRIPTION

Figure 1:
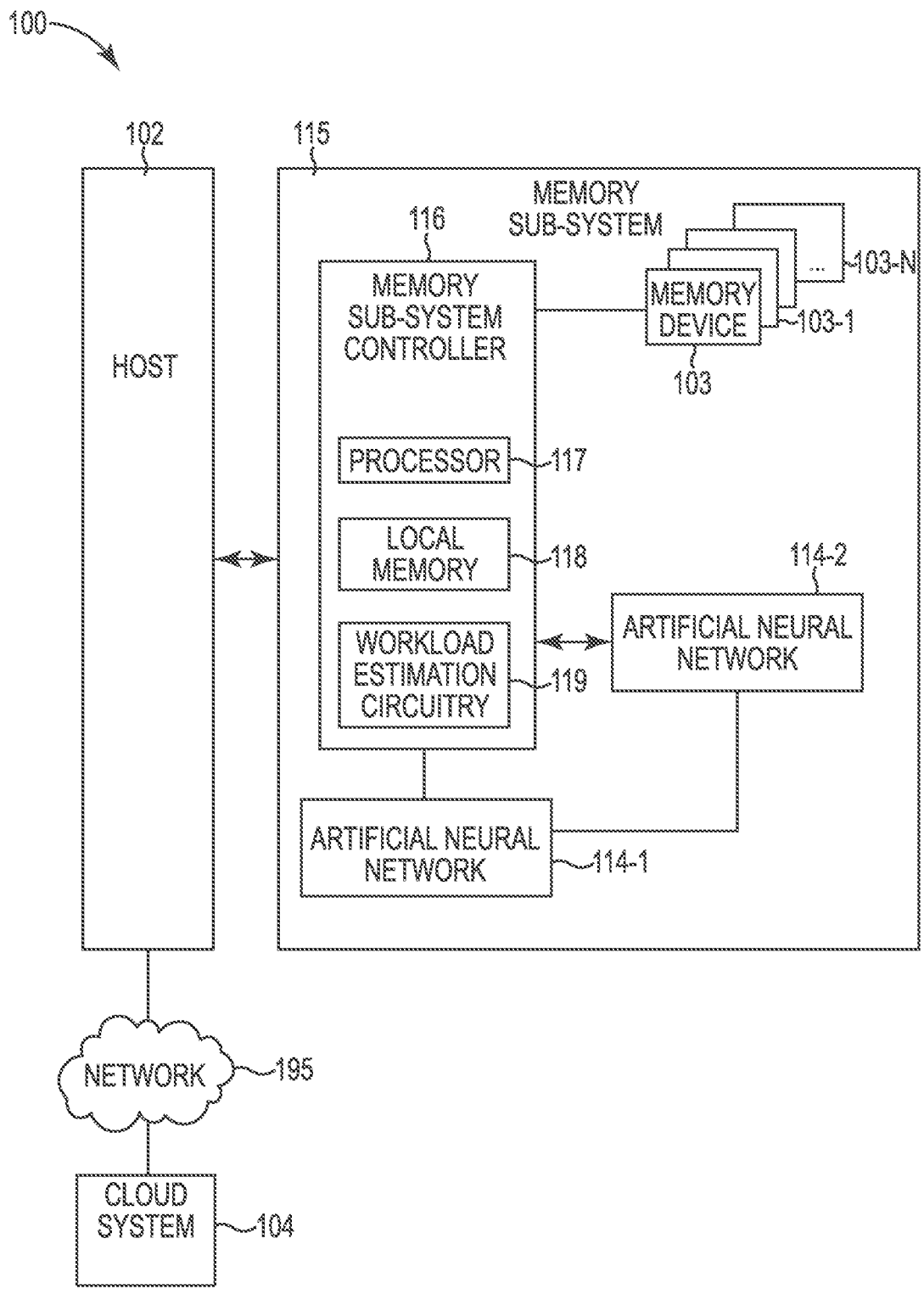
FIG. 1 is a block diagram of an apparatus in the form of a computing system including a memory sub-system in accordance with a number of embodiments of the present disclosure.

The present disclosure includes apparatuses and methods related to power down workload estimation using artificial neural networks (ANNs). When a memory device is powered on, a number of maintenance (or workload) operations may be performed prior to a user being able to operate the memory device as desired. Power down durations of memory devices can lead to power demands to perform maintenance operations. For example, data written to a memory device at high temperatures can have inherently lower retention in the memory device and can be relocated before a threshold amount of time elapses. Prolonged power down durations make this problem worse. Temperature remediation is one example of a maintenance operation that can be performed when a memory device is powered on.

Media scan operations are also a form of maintenance that can be performed when a memory device is powered on. Media scan frequencies may be lagging behind on needed run operations and need to catch up over a given time interval. Free block pools may be low and garbage collection may be performed to bring them back up to good operating levels.

Garbage collection operations are an additional type of maintenance operation that can be performed on memory. Garbage collection reclaims memory occupied by objects that are no longer in use. Memory devices may have blocks of memory with a mix of valid and invalid data. A garbage collection operation may copy the valid data to new block and erase the valid data and the invalid data written to the "old" block. This may free up blocks of memory in the memory device for subsequent receipt and/or storage of new data. Reclaiming memory, utilizing garbage collection, allows for the reclaimed memory to be available to store additional data whereas the memory prior to being reclaimed is not available to store additional data. Performing garbage collection can result in a drop in performance of a memory sub-system. Performing garbage collection on a memory device that is powered on can interfere with a user's experience.

Wear leveling is another common maintenance operations that may be performed on memory. Wear leveling operations ensure that the memory is being used as efficiently as possible and maximizes memory capacity and longevity. Performing wear leveling operations on memory when the memory device is powered on can also interfere with the user.

Memory overhead can not only cause a decrease in performance of the memory sub-system but can also cause a reduction in the life of the memory sub-system. Memory overhead can also affect power resources of the memory sub-system. For example, performing garbage collection operations and/or read recovery operations can cause a power overhead on the memory sub-system.

Aspects of the present disclosure address the above and other deficiencies. In a number of examples, a quantity of maintenance operations can be predicted, by an artificial neural network (ANN) system, for performance on a memory device prior to a power down event of the memory. The prediction can be based on a predicted duration of the upcoming power down event of the memory device. By performing the maintenance operations on the memory device prior to the power down event, less maintenance is required to be performed when the device is powered back on. This may lead to a better user experience because the user is able to use the device more quickly when powered on, without the performance of the maintenance operations interfering with use of the device, than if the maintenance operations were performed after the memory device is powered back on.

As used herein, an artificial neural network (ANN) can provide learning by forming probability weight associations between an input and an output. The probability weight associations can be provided by a plurality of nodes that comprise the ANN. The nodes together with weights, biases, and activation functions can be used to generate an output of the ANN based on the input to the ANN. An ANN can utilize a number of inputs to generate a data use rating (e.g., indicator).

In various examples, the ANN system can be updated via a cloud system 104. The ANN system can be coupled to a cloud system 104 via host. The host can be coupled to the memory sub-system. New weights and/or biases can be provided to the ANN embedded in the memory sub-system via the host. The weights and biases can be utilized to predict the duration of the subsequent power down event of the memory device, for example.

In another example, the ANN system may be optimized or trained to improve predictions based on feedback of comparisons of the prediction to the actual duration of the subsequent power down event. Feedback may also include comparison of the predicted quantity of maintenance operations to perform on the memory device to the actual quantity of maintenance operations that were performed. Although the example maintenance operations herein are provided in terms of garbage collection, wear leveling, media scan, and/or temperature remediation, the examples described herein can also apply to other maintenance operations other than those provided.

The figures herein follow a numbering convention in which the first digit or digits correspond to the drawing figure number and the remaining digits identify an element or component in the drawing. Similar elements or components between different figures may be identified by the use of similar digits. For example, 115 may reference element "15" in FIG. 1, and a similar element may be referenced as 215 in FIG. 2. Analogous elements within a Figure may be referenced with a hyphen and extra numeral or letter. See, for example, elements 103-1, . . . , 103-N in FIG. 1. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is a block diagram of an apparatus in the form of a computing system including a memory sub-system in accordance with a number of embodiments of the present disclosure. As used herein, the memory sub-system 115, the ANNs 114-1, 114-2, the memory devices 103-1 to 103-N, and/or the host 102, for example, might also be separately considered an "apparatus."

The memory sub-system 115 can include media, such as volatile memory devices and/or non-volatile memory devices (e.g., memory device 103-1 to 103-N). The memory devices 103-1 to 103-N can be referred to as memory devices 103.

A memory sub-system 115 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a desktop computer, laptop computer, network server, mobile device, a vehicle (e.g., automobile, airplane, drone, train, or other conveyance), Internet of Things (IoT) enabled device, embedded computer (e.g., one included in a vehicle, industrial equipment, or a networked commercial device), or such computing device that includes memory and a processing device (e.g., a processor).

The computing system 100 can include a host system 102 that is coupled to one or more memory sub-systems 115. In some embodiments, the host system 102 is coupled to different types of memory sub-systems 115. FIG. 1 illustrates an example of a host system 102 coupled to one memory sub-system 115. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 102 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 102 uses the memory sub-system 115, for example, to write data to the memory sub-system 115 and read data from the memory sub-system 115.

The host system 102 can be coupled to the memory sub-system 115 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 102 and the memory sub-system 115. The host system 102 can further utilize an NVM Express (NVMe) interface to access components (e.g., memory devices 103) when the memory sub-system 115 is coupled with the host system 102 by the PCIe interface. The physical host interface can provide an interface for passing control, address, data, and other signals between the memory sub-system 115 and the host system 102. FIG. 1 illustrates a memory sub-system 115 as an example. In general, the host system 102 can access multiple memory sub-systems via a same communication connection, multiple separate communication connections, and/or a combination of communication connections.

The memory devices 103 can include various combinations of the different types of non-volatile memory devices and/or volatile memory devices. The volatile memory devices can be, but are not limited to, random access memory (RAM), such as dynamic random access memory (DRAM) and synchronous dynamic random access memory (SDRAM).

Some examples of non-volatile memory devices (e.g., memory device 103) include NAND type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 103 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 103 can include one or more arrays of memory cells such as SLCs, MLCs, TLCs, QLCs, PLCs, or any combination of such. In some embodiments, a particular memory device can include an SLC portion, and an MLC portion, a TLC portion, a QLC portion, or a PLC portion of memory cells. The memory cells of the memory devices 103 can be grouped as pages that can refer to a logical unit of the memory device used to store data. With some types of memory (e.g., NAND), pages can be grouped to form blocks.

Although non-volatile memory devices such as 3D cross-point array of non-volatile memory cells and NAND type memory (e.g., 2D NAND, 3D NAND) are described, the memory devices 103 can be based on various other types of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-OR (NOR) flash memory, and electrically erasable programmable read-only memory (EEPROM).

A memory sub-system controller 116 (or controller 116 for simplicity) can communicate with the memory devices 103 to perform operations such as reading data, writing data, or erasing data at the memory devices 103 and other such operations. The memory sub-system controller 116 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 116 can be a microcontroller, special purpose logic circuitry (e.g., a field programmable gate array (FPGA), an application specific integrated circuit (ASIC), etc.), or other suitable processor.

The memory sub-system controller 116 can include processing device such as a processor 117 configured to execute instructions stored in a local memory 118. In the illustrated example, the local memory 118 of the memory sub-system controller 116 includes an embedded memory configured to store instructions for performing various processes, operations, logic flows, and routines that control operation of the memory sub-system 115, including handling communications between the memory sub-system 115 and the host system 102.

In some embodiments, the local memory 118 can include memory registers storing memory pointers, fetched data, etc. The local memory 118 can also include read-only memory (ROM) for storing micro-code, for example. While the example memory sub-system 115 in FIG. 1 has been illustrated as including the memory sub-system controller 116, in another embodiment of the present disclosure, a memory sub-system 115 does not include a memory sub-system controller 116, and can instead rely upon external control (e.g., provided by an external host, or by a processor or controller separate from the memory sub-system).

In general, the memory sub-system controller 116 can receive commands or operations from the host system 102 and can convert the commands or operations into instructions or appropriate commands to achieve the desired access to the memory devices 103. The memory sub-system controller 116 can be responsible for other operations such as wear leveling operations, garbage collection operations, media scan operations, temperature remediation operations, error detection and error-correcting code (ECC) operations, encryption operations, caching operations, and address translations between a logical address (e.g., logical block address (LBA), namespace) and a physical address (e.g., physical block address) that are associated with the memory devices 103. The memory sub-system controller 116 can further include host interface circuitry to communicate with the host system 102 via the physical host interface. The host interface circuitry can convert the commands received from the host system into command instructions to access the memory devices 103 as well as convert responses associated with the memory devices 103 into information for the host system 102.

The memory sub-system 115 can also include additional circuitry or components that are not illustrated. In some embodiments, the memory sub-system 115 can include a cache or buffer (e.g., DRAM) and address circuitry (e.g., a row decoder and a column decoder) that can receive an address from the memory sub-system controller 116 and decode the address to access the memory devices 103.

In some embodiments, the memory devices 103 include a local media controller that operates in conjunction with memory sub-system controller 116 to execute operations on one or more memory cells of the memory devices 103. An external controller (e.g., memory sub-system controller 116) can externally manage the memory devices 103 (e.g., perform media management operations on the memory devices). In some embodiments, memory devices 103 are managed memory devices, which are raw memory devices combined with local controllers for media management within the same memory device package. An example of a managed memory device is a managed NAND (MNAND) device.

The Artificial Neural Networks 114-1, 114-2 can be referred to as ANNs 114. The ANNs 114 can be a deep learning accelerator (DLA), for example. The DLA, for example, could utilize long short-term memory (LSTM) networks. The ANNs 114 can be implemented on an edge of the memory system 115. For example, the ANNs 114 can be implemented external to the memory devices 103. The ANNs 114 can be coupled to an output path that couples the memory devices 103 to the I/O circuitry of the memory sub-system 115. The memory sub-system 115 may consist of one or more Artificial Neural Networks (i.e. 114-1 and 114-2).

The memory sub-system controller 116 can control the ANNs 114. For example, the memory sub-system controller 116 can provide data to the ANNs 114 and can receive outputs from the ANNs 114. The memory sub-system controller 116 can also cause the output of the ANNs 114 to be provided to the memory devices 103 and/or the host system 102.

The memory sub-system controller 116 can also include workload estimation circuitry 119. The workload estimation circuitry 119 can be configured to manage the output of the ANNs 114 to perform maintenance operations on the memory devices 103. The workload estimation circuitry 119 can also be configured to provide inputs to the ANNs 114. For instance, the workload estimation circuitry 119 can provide the quantity of outstanding maintenance operations to be performed on the memory device 103 to the ANNs 114. The workload estimation circuitry 119 can also be configured to perform additional processing on the input to the ANNs 114 and/or the output of the ANNs 114, as needed.

The ANNs 114 can be configured to output a predicted quantity of maintenance operations to be performed prior to the subsequent dower down event of the memory device 103 and the predicted duration of the subsequent power down event of memory device 103. For example, an input, including the total amount of wear leveling or minimum/maximum error code gap of the memory device 103 and other memory device 103 information, can be provided to the ANNs 114. The ANN 114-2 can output a predicted quantity of wear leveling maintenance operations to perform on the memory device 103 prior to a subsequent power down event. The ANNs 114 can provide the predicted quantity of wear leveling maintenance operations to perform on the memory device 103, prior to a subsequent power down event, to the workload estimation circuitry 119. The workload estimation circuitry 119 can be configured to direct the controller 116 to perform the maintenance operations on the memory devices 103.

The computing system 100 can be coupled to network 195. The network 195 may be a cloud system 104. The network 195 may update the ANNs 114 with weights and biases. The cloud system 104 of network 195 may provide the updated weights and biases based on simulated power on/power off cycles of a model device. The update may also be based on aggregate power cycle durations of similar devices.

Figure 2:
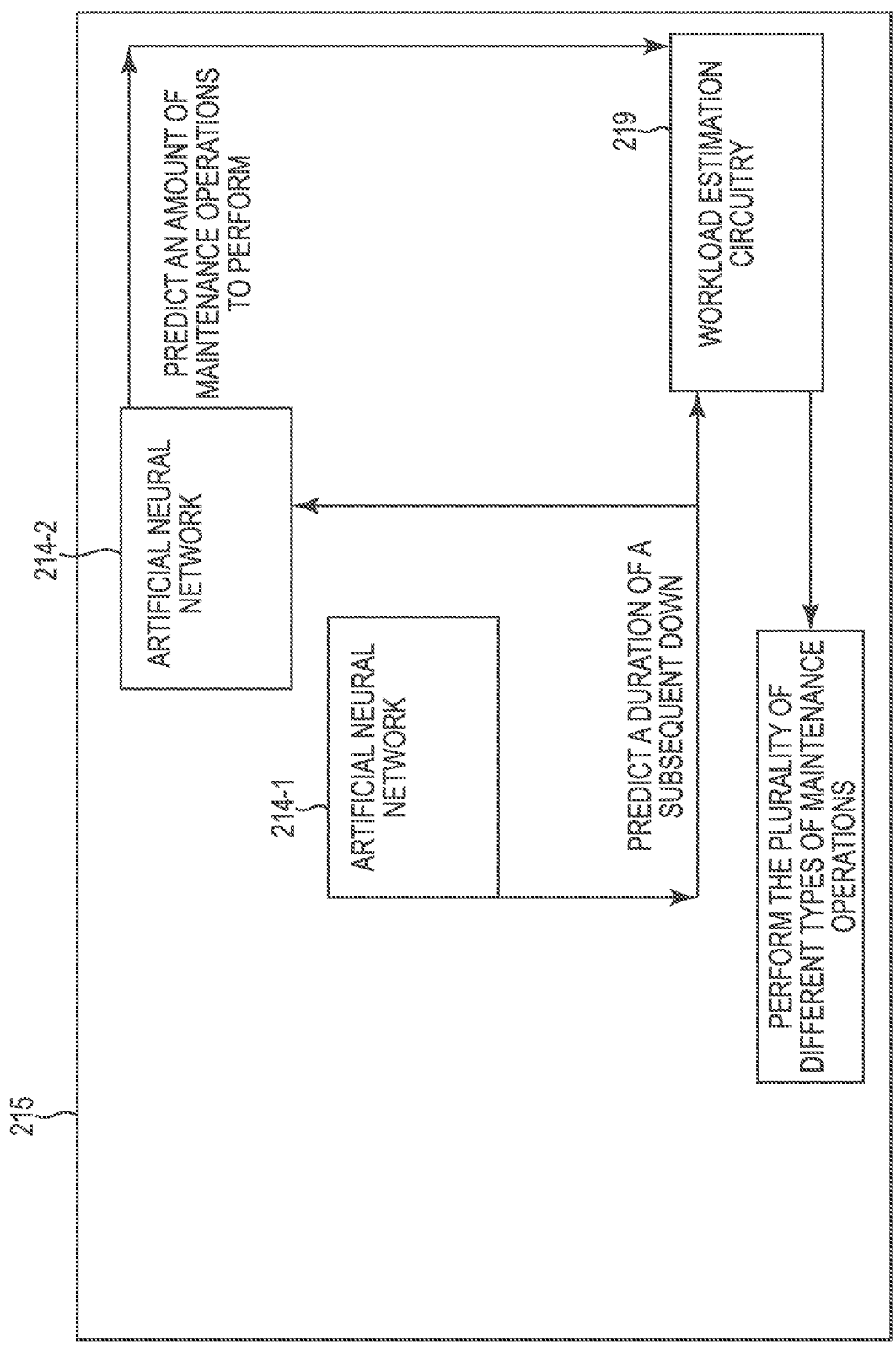
FIG. 2 illustrates a block diagram of an artificial neural network for power down workload estimations in accordance with a number of embodiments of the present disclosure.

FIG. 2 illustrates a block diagram of an artificial neural network for power down workload estimations in accordance with a number of embodiments of the present disclosure. The memory sub-system 215 includes an ANNs 214-1, an ANNs 214-2, and workload estimation circuitry 219. The ANNs 214-1 and 214-2 can be coupled together and/or can be coupled to the workload estimation circuitry 219.

In various instances, the ANNs 214-1 can generate an output that can be used as an input for ANNs 214-2 and/or the workload estimation circuitry 219. For example, the ANNs 214-1 can provide, as an input, the predicted duration of the subsequent power down event to the ANNs 214-2 and/or the workload estimation circuitry 219. The predicted duration of the subsequent power down event input of ANNs 214-2 can be used to create an input to workload estimation circuitry 219. This input can include a predicted quantity of maintenance operations to perform on the memory device prior to the subsequent power down event.

Figure 3:
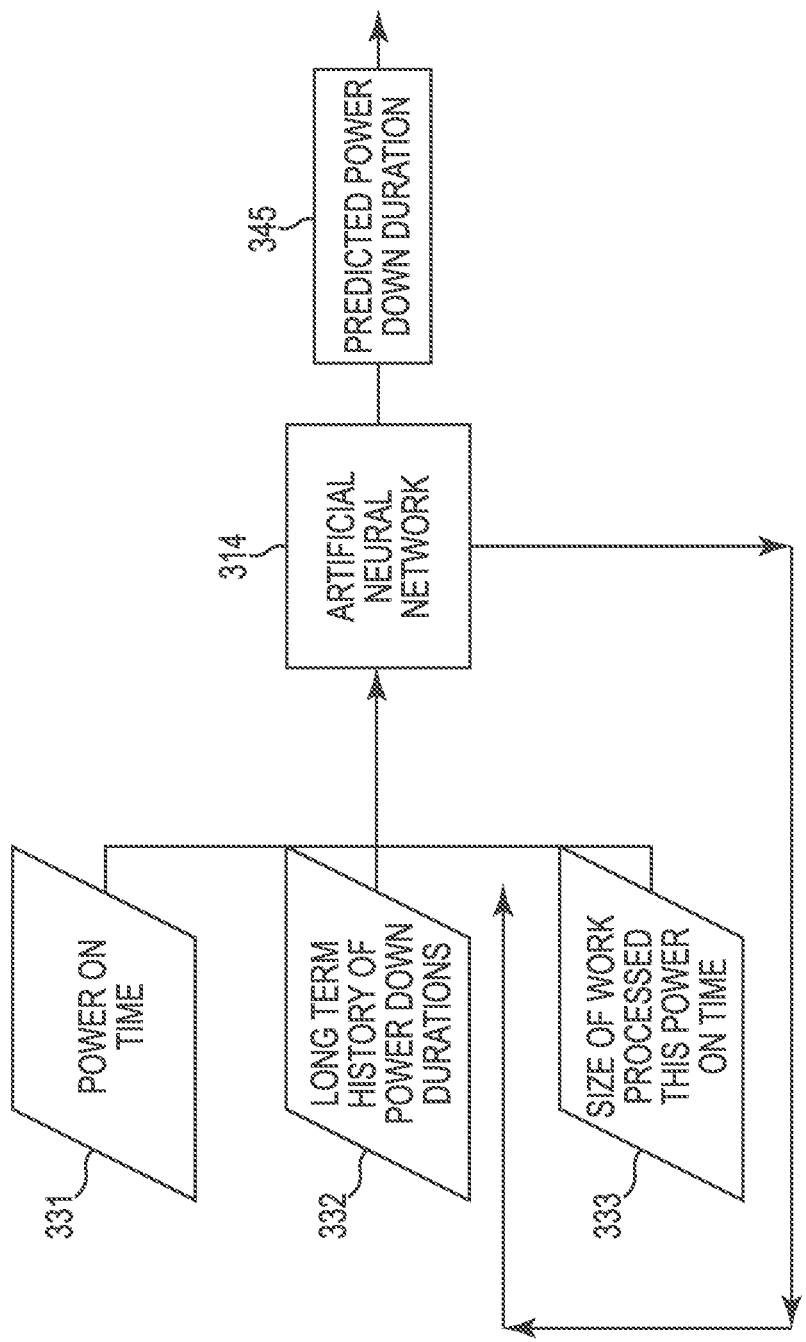
FIG. 3 illustrates an example flow diagram of an artificial neural network for predicting a power down duration in accordance with a number of embodiments of the present disclosure.

FIG. 3 illustrates an example flow diagram of an artificial neural network for predicting a power down duration in accordance with a number of embodiments of the present disclosure. FIG. 3 includes an artificial neural network 314.

The ANNs 314 can receive as input a power on time 331, long-term history of power down durations 332, and a size of maintenance operations perform on the current power-on time 333. The ANNs 314 can provide the predicted power down duration 345 of the subsequent power down event as an output based on the inputs.

As used herein, the power-on time 331 describes the duration of time that the memory device has been powered-on. The long-term history of power-down durations 332 can describe the history of the time durations of the previous power-down events of the memory device. The size of maintenance operations performed on the current power-on time 333 can include the quantity of maintenance operations that were performed when the memory device was previously powered-on. The 331, 332, 333 can be generated by the workload estimation circuitry.

The output can be provided to workload estimation circuitry. The output can be utilized, for example, as an input for predicting the quantity of maintenance operations to be performed on the memory device prior to the subsequent power down event (explained in further detail in this disclosure).

Figure 4:
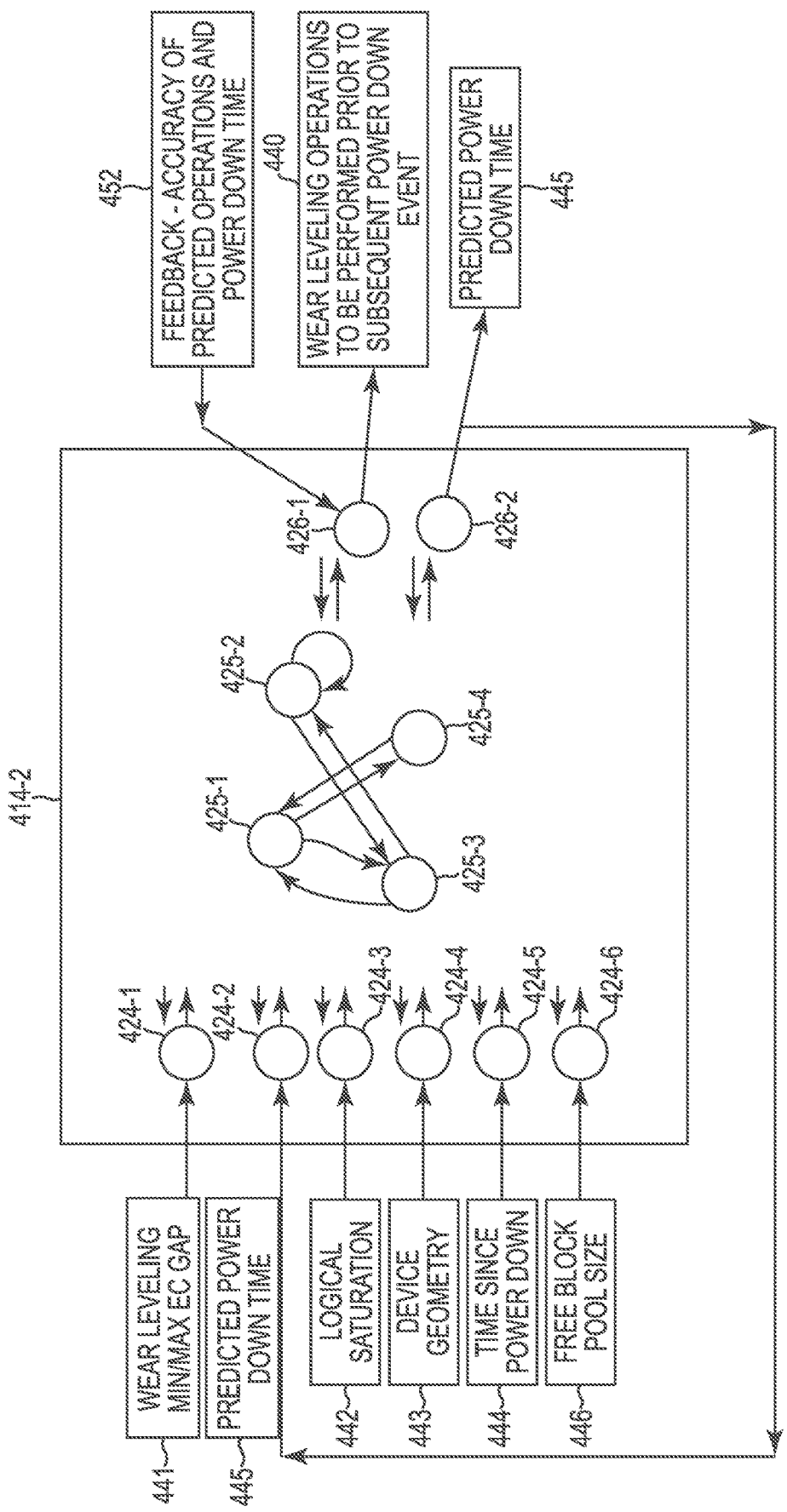
FIG. 4 illustrates an example flow diagram for predicting wear leveling operations in accordance with a number of embodiments of the present disclosure.

FIG. 4 illustrates an example flow diagram for predicting wear leveling operations in accordance with a number of embodiments of the present disclosure. The prediction can be generated by the ANNs 414 (ANN 414 can be analogous to ANN 114-2 in FIG. 1). For example, inputs can be provided by the workload estimation circuitry to the ANNs 414. The ANNs 414 can then provide the predicted power down duration 445 and the predicted wear leveling operations 440 to be performed prior to the subsequent power down event as outputs. The wear leveling operations 440 can be, but is not limited to, a quantity of wear leveling operations to be performed or a description of specific wear leveling operations to perform.

Feedback 452 can be used to optimize the predictions. For example, the predicted power down time can be compared to an actual power-down time. The difference can be utilized to train the weights and/or biases of the ANN 414. In another example, the workload estimation circuitry 119 can perform the training with the weights and/or biases of the ANNs 414-2 or the different ANNs 144-1. Feedback 452 can also include a comparison of the predicted wear leveling operations 440 with an actual amount of wear leveling operations that was needed to be performed on the device when it is powered on. The difference can be used to train the weights and/or biases of the ANN 414. The accuracy of the predicted wear leveling operations and power down time can be included as feedback 452. The training of the weights and/or biases of the ANN 414 can take place, for example, in the controller of the memory sub-system 116, at the host level, at the cloud system level, and/or at a different ANN (e.g., not ANN 114-1 or ANN 114-2).

The inputs can be received by the ANNs 414-2 at input nodes 424-1, 424-2, ... 424-6, referred to herein as input nodes 424. Each of the input nodes 424 receives data from the workload estimation circuitry. For example, the total quantity of wear leveling 441 is loaded into the ANN 414-2 at input node 424-1. The predicted power down time 445 is loaded into ANNs 414-2 at input node 424-2. The logical saturation 442 of the memory device is loaded into ANNs 414-2 at input node 424-3. The memory device geometry 443 is loaded into ANNs 414-2 at input node 424-4. The time since the previous power down event of the memory device 444 is loaded into the ANNs 414-2 at input node 424-5. The free block pool size 446 is loaded into the ANNs 414-2 at input node 426-6.

Wear leveling works to distribute the data stored in memory in a manner that maximizes the longevity of the device. Blocks of storage can wear out with repeated program/erases cycles of the data in each block. A total quantity of wear leveling operations 441 can be the total amount of wear leveling required to maximize the life span of the device at a given moment. Logical saturation 442 can be the portion of the user logic block addresses (LBAs) that contain data. The memory device geometry 443 may describe the internal structure of the memory device. Block pools in memory devices can be the grouping of memory cells into pools for better management of data storage in the memory device. The free block pool size 446 can refer to the amount of free block pools available in the memory device.

Once the inputs are loaded into the ANNs 414-2 via the input nodes, the internal nodes 425-1, 425-2, 425-3, 425-4, among other possible internal nodes, are used to make a prediction of the subsequent power down duration 445 and wear leveling operations 440 to be performed prior to the subsequent power down event. The internal nodes 425-1, 425-2, 425-3, 425-4 can be referred to as internal nodes 425. The internal nodes 425 may use long short-term memory (LSTM) network architecture to produce the outputs. The outputs are exported from the ANNs 414-2 by output nodes 426. Output nodes 426-1, 426-2 can be referred to as output nodes 426. Output node 426-lean export wear leveling operations 440 to be performed prior to the subsequent power down event. Output node 426-2 can also export the predicted power down 445 of the subsequent power down event. In one embodiment, predicted power down time 445 can be used as an input to the ANNs 414-2. Output nodes 426 can also be used to input feedback 452 into the ANNs 414-2 for training/learning for future predictions.

Figure 5:
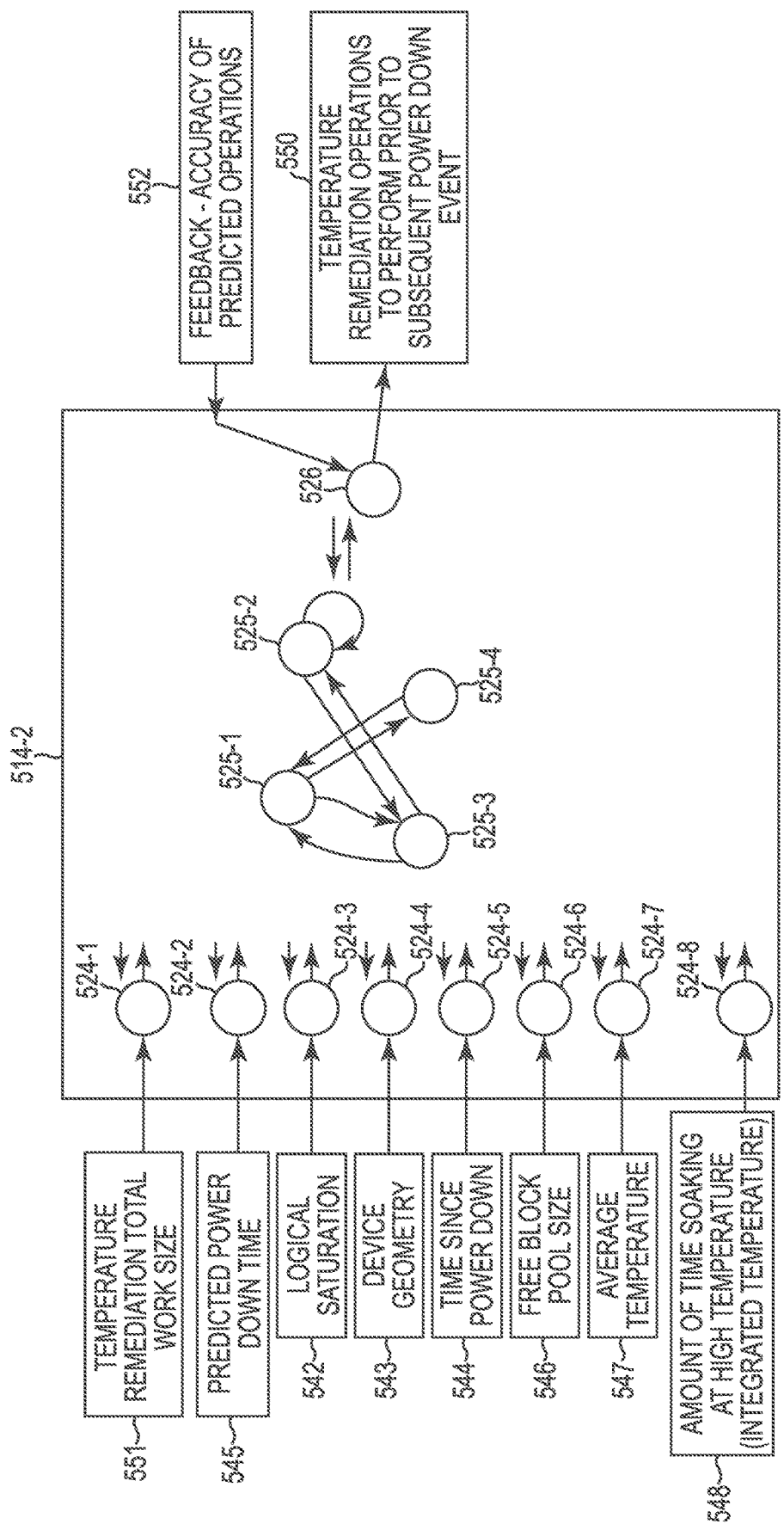
FIG. 5 illustrates an example flow diagram for predicting temperature remediation operations in accordance with a number of embodiments of the present disclosure.

FIG. 5 illustrates an example flow diagram for predicting temperature remediation operations in accordance with a number of embodiments of the present disclosure. FIG. 5 shows inputs for the ANNs 514-2 provided by the workload estimation circuitry, the ANNs 514-2, and output predictions of the ANNs 514-2. In one embodiment, the inputs are provided by the workload estimation circuitry to the ANNs 514-2 via input nodes 524-1, 524-2, . . . , 524-8, referred to herein as input nodes 524. Internal nodes 525-1, 525-2, 525-3, and 525-4, referred to herein as internal nodes 525, predict the amount of temperature remediation operations 550 to perform on the memory device prior to a subsequent power down event. The predicted temperature remediation operations 550 are export from the ANNs 514-2 via output node 526 to the workload estimation circuitry. The temperature remediation operations 550 can be, but is not limited to, a quantity of temperature remediation operations to be performed or a description of specific temperature remediation operations to perform.

In one embodiment, for example, the total amount of temperature remediation operations 551 performed on the memory device is input to the ANNs 514-2 via input node 524-1. The predicted power down time 551 of the subsequent power down event may be provided to ANNs 514-2 by a different ANNs and/or the workload estimation circuitry via input node 524-2. The logical saturation 542 of the memory device may be provided by the workload estimation circuitry to the ANNs 514-2 via input node 524-3. The device geometry 543 of the memory device may be provided by the workload estimation circuitry to the ANNs 514-2 via input node 524-4. The time since the previous power down event 544 may be provided by the workload estimation circuitry to the ANNs 514-2 via input node 524-5. The memory device free block pool size 546 may be provided by the workload estimation circuitry to the ANNs 514-2 via input node 524-6. The average temperature 547 of the memory device may be provided by the workload estimation circuitry to the ANNs 514-2 via input node 524-7. The amount of time soaking at high temperatures 548 of the memory device may be provided by the workload estimation circuitry to the ANNs 514-2 via input node 524-8.

Once the inputs are uploaded to the ANNs 514-2 via the input nodes 524, the inputs are directed to the internal nodes 525 of the ANNs 514-2 to calculate the temperature remediation operations 550 to be perform on the memory device prior to the subsequent power down event. The temperature remediation operations 550 are exported to the workload estimation circuitry from the ANNs 514-2 via output node 526. The accuracy of the predicted temperature remediation operations inputted back into the ANN 514-2 for use in future predictions as feedback 552. Feedback 552 can include a comparison of the predicted temperature remediation operations 550 with an actual amount of temperature remediation operations that were needed to be performed on the device when it is powered on. The difference can be used to train the weights and/or biases of the ANN 514. The accuracy of the predicted temperature remediation operations can be included as feedback 552. The training of the weights and/or biases of the ANNs 514-2 can take place in the controller of the memory sub-system 116, at the host level, at the cloud system level, or at a different ANN (e.g., ANNs other than the ANN 114-1 and/or the ANN 114-2 of FIG. 1).

Figure 6:
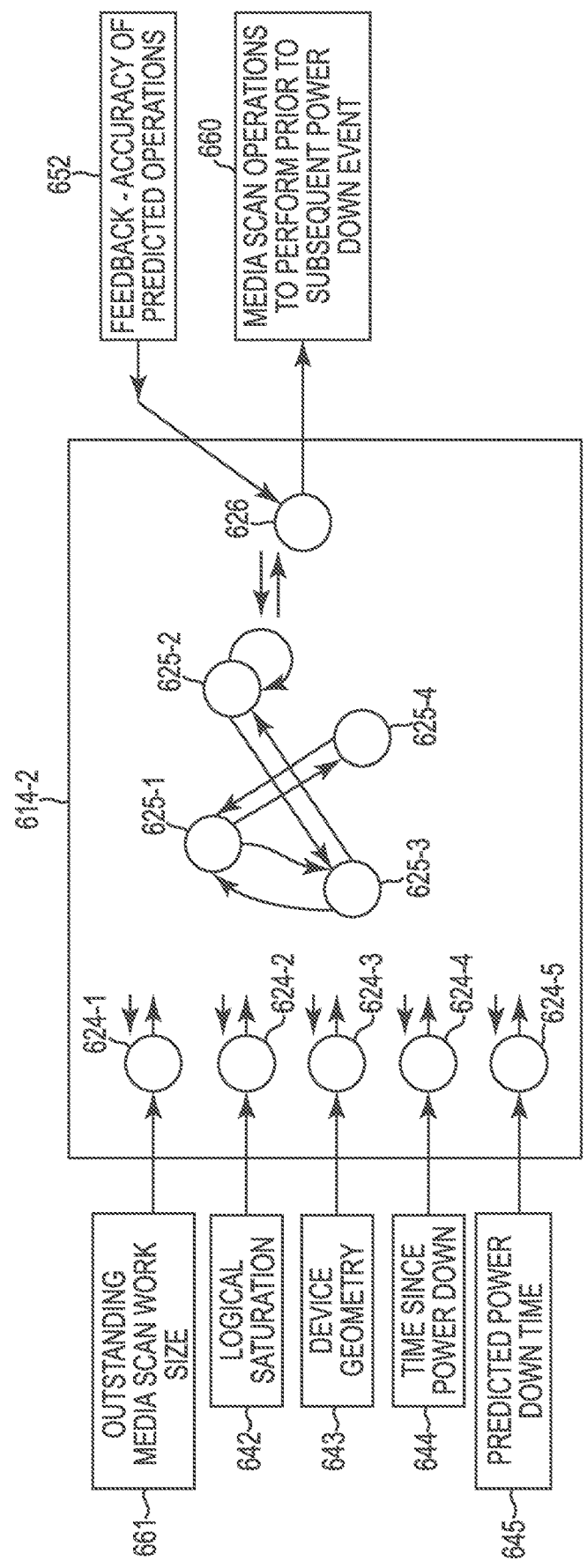
FIG. 6 illustrates an example flow diagram for predicting media scan operations in accordance with a number of embodiments of the present disclosure.

FIG. 6 illustrates an example flow diagram for predicting media scan operations in accordance with a number of embodiments of the present disclosure. FIG. 6 shows inputs for the ANNs 614-2 (e.g., the ANN 114-2 in FIG. 1) provided by the workload estimation circuitry, the ANNs 614-2, and output predictions of the ANNs 614-2. FIG. 6 also shows the inputs being uploaded to the ANNs 614-2 via input nodes 624-1, 624-2, . . . , 624-5, referred herein to as input nodes 624, and the outputs being exported from the ANNs 614-2 via the output node 626.

The ANNs 614-2 can include a number of input nodes 624, internal nodes 625-1, 625-2, 625-3, and 625-4, referred herein to as internal nodes 625, and output nodes 626. Input nodes 624 can be the point where individual or multiple input variables are uploaded to the ANN 614-2. The internal nodes 625 can be the portion of the ANNs 614-2 that performs calculations to predict the media scan operations 660 to perform prior to the subsequent power down event as an output. The media scan operations 660 can be exported from the ANNs 614-2 via the export node 626 to the workload estimation circuitry. The media scan operations 660 can be, but are not limited to, a quantity of media scan operations to be performed or a description of specific media scan operations to perform.

In one embodiment, the total outstanding media scan operation 661 may be loaded into the ANNs 614-2 from the workload estimation circuitry via input node 624-1. Media scan operations can refer to an operation of scanning the memory device for detecting errors that may need to be corrected in the data stored. The total outstanding media scan operation 661 may refer to the portion of the memory device that is required to be checked for errors. The logical saturation 642 of the memory device may be loaded into the ANNs 614-2 from the workload estimation circuitry via input node 624-2. The device geometry 643 of the memory device may be loaded into the ANNs 614-2 from the workload estimation circuitry via input node 624-3. The time since the last power down 645 of the memory device may be loaded into the ANNs 614-2 from the workload estimation circuitry via input node 624-4. The predicted power down time 645 of the memory device may be loaded into the ANNs 614-2 from the workload estimation circuitry via input node 624-5. Each input variable used by the ANNs 614-2 to make the output of a predicted media scan operations 660 to perform prior to the subsequent memory device power down event can be uploaded via their corresponding input node.

Once the required inputs have been uploaded to the ANNs 614-2, internal nodes 625 may calculate the amount of media scan operations 660 to perform on the memory device prior to the subsequent power down event. The amount of media scan operations 660 to be perform may be exported from the ANNs 614-2 to the workload estimation circuitry via output node 626.

Feedback 652 may be used to optimize future predictions. For example, feedback 652 can include a comparison of the predicted media scan operations 660 with an actual amount of media scan operations that were needed to be performed on the device when it is powered on. The difference can be used to train the weights and/or biases of the ANN 614. The accuracy of the predicted media scan operations can be included as feedback 652. The difference can be used to train the weights and/or biases of the ANN 614-2. The training of the weights and/or biases of the ANN 614 can take place, for example in the controller of the memory sub-system 116 of FIG. 1, at the host level, at the cloud system level, or at a different ANN (e.g. ANNs other than ANN 114-1 or ANN 114-2 of FIG. 1).

Figure 7:
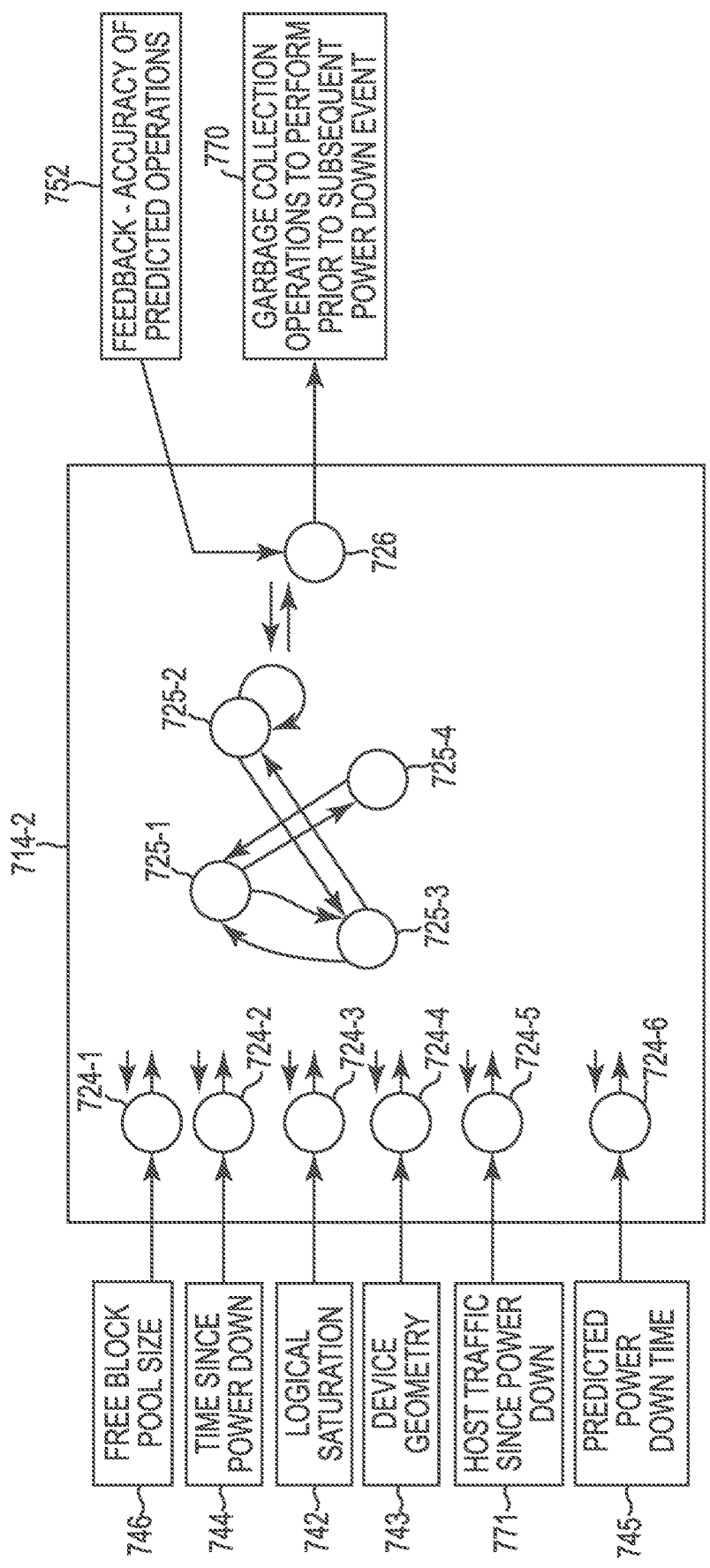
FIG. 7 illustrates an example flow diagram for predicting garbage collection operations in accordance with a number of embodiments of the present disclosure.

FIG. 7 illustrates an example flow diagram for predicting garbage collection operations in accordance with a number of embodiments of the present disclosure. FIG. 7 includes the ANNs 714-2 (e.g., the ANN 114-2 of FIG. 1) consisting of input nodes 724, internal nodes 725, and output nodes 726. Input node 724-1, 724-2, . . . , 726-6 can be referred herein to as input nodes 726. Internal node 725-1, 725-2, 725-3, and 725-5 can be referred herein as internal nodes 725. FIG. 7 also include the various inputs used for making calculations/predictions by the ANNs 714-2 and the amount of garbage collection 770 to perform on the memory device prior to the subsequent power down event of the memory device. The garbage collection operations 770 can be, but is not limited to, a quantity of garbage collection operations to be performed or a description of specific garbage collection operations to perform.

The workload estimation circuitry may provide the ANNs 714-2 with inputs via input nodes 724. Each variable uploaded to the ANNs 714-2 may be inputted via its own input node 724. For example, the free block pool size 746 of the memory device may be uploaded to the ANNs 714-2 from the workload estimation circuitry via input node 724-1. The time since the last power down 744 of the memory device may be uploaded to the ANNs 714-2 from the workload estimation circuitry via input node 724-2. The logical saturation 742 of the memory device may be uploaded to the ANNs 714-2 from the workload estimation circuitry via input node 724-3. The device geometry 743 of the memory device may be uploaded to the ANNs 714-2 from the workload estimation circuitry via input node 724-4. The amount of host traffic since the last power down 771 to the memory device may be uploaded to the ANNs 714-2 from the workload estimation circuitry via input node 724-5. The predicted power down time 745 of the memory device may be uploaded to the ANNs 714-2 from the workload estimation circuitry via input node 724-6.

The inputs, once in the ANNs 714-2 via the input nodes 724, are directed to the internal nodes 725 to generate/calculate the amount of garbage collection operations 770 to perform on the memory device prior to the subsequent power down event. The garbage collection operations 770 calculated by internal nodes 725 of the ANNs 714-2 may be exported to the workload estimation circuitry via export node 726. In other words, the inputs are directed to the internal nodes 725 of the ANNs 714-2 via input nodes 724 for generating the garbage collection operations 770 as an output to the workload estimation circuitry via export node 726.

Output node 726 can also serve as in the input node for the feedback 752. Feedback 752 may be the accuracy of the prediction of the amount of garbage collection to perform on the memory device prior to the subsequent power down event of the memory device to the actual amount of garbage collection that was required to be perform on the memory device when it is subsequently powered on. The feedback 752 enables the ANNs 714-2 to learn/or be trained so that future garbage collection operations 770 predictions will be more accurate. The training of the weights and/or biases of the ANN 714-2 can take place in the controller of the memory sub-system 116, at the host level, at the cloud system level, or at a different ANN (e.g., ANNs other than the ANN 114-1 and/or the ANN 114-2 of FIG. 1).

Figure 8:
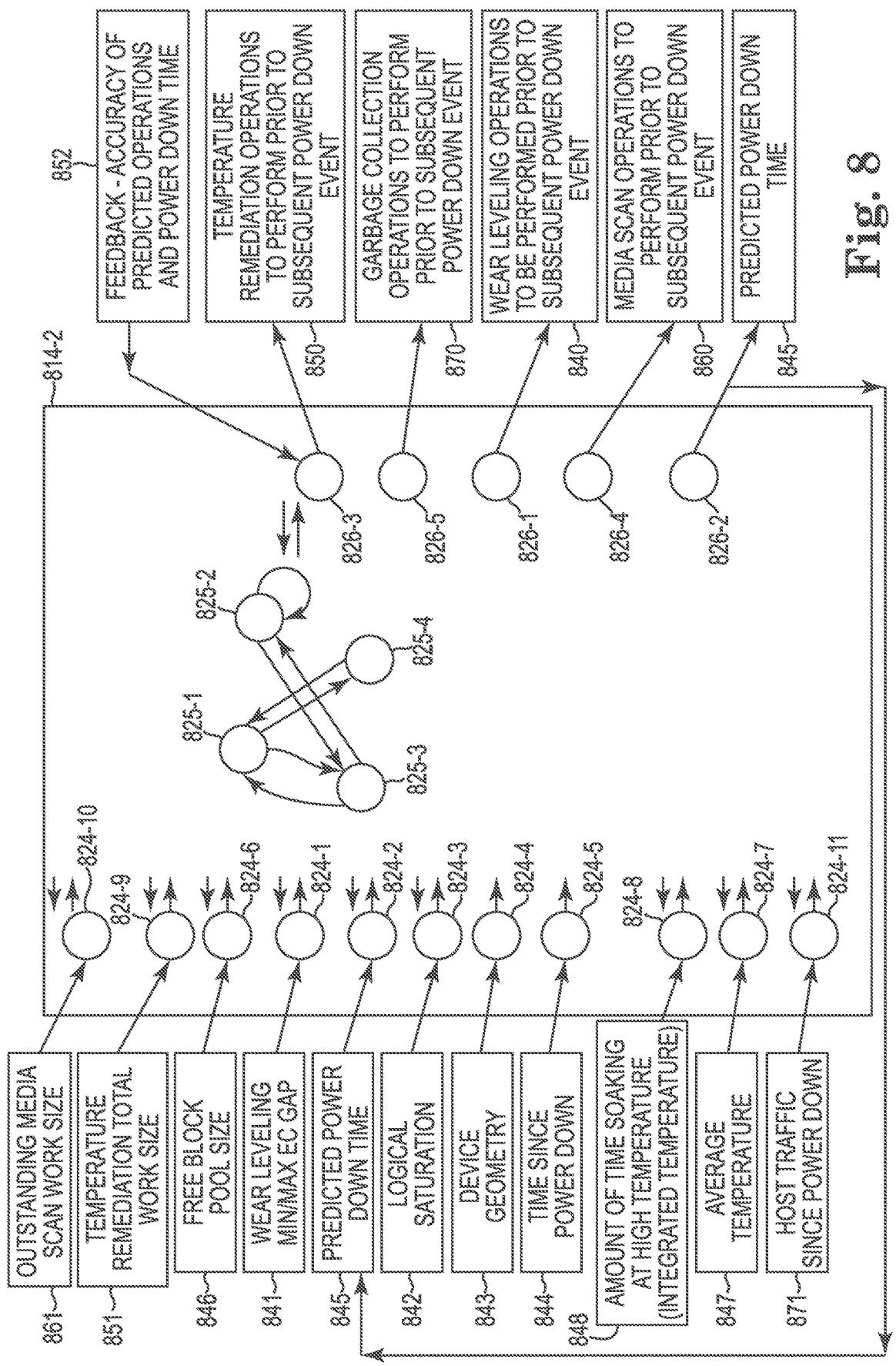
FIG. 8 illustrates an example flow diagram for predicting combined workload operations in accordance with a number of embodiments of the present disclosure.

FIG. 8 illustrates an example flow diagram for predicting combined workload operations in accordance with a number of embodiments of the present disclosure. FIG. 8 includes ANNs 814-2 (analogous to 114-2 in FIG. 1) comprising input nodes 824, internal nodes 825, and export nodes 826. Input node 824-1, 824-2, . . . , 824-11 may be referred herein to as input nodes 824. Internal nodes 825-1, 825-2, 825-3, and 825-4 may be referred herein to as internal nodes 825. Output nodes 826-1, 826-2, . . . , 826-5 may be referred herein to as output nodes 826. FIG. 8 also includes various inputs (explained in detail below) of the ANNs 814-2 and maintenance operations (expanded on further below) as outputs of the ANNs 814-2. FIG. 8 further shows feedback 852 being input to ANNs 814-2 for training. Feedback 852 may be the accuracy of the prediction of the amount of maintenance operations to perform on the memory device prior to the subsequent power down event of the memory device to the actual amount of maintenance operations that were required to be perform on the memory device when it is subsequently powered on. Feedback 852 may also include the accuracy of the predicted subsequent power-down duration of the memory device to the actual duration of the subsequent power-down duration. The feedback 852 enables the ANNs 814-2 to learn/or be trained so that future maintenance operations predictions will be more accurate. The training of the weights and/or biases of the ANNs 814-2 can take place in the controller of the memory sub-system 116, at the host level, at the cloud system level, or at a different ANN (e.g., ANNs other than the ANN 114-1 and/or the ANN 114-2 of FIG. 1). The inputs are provided to the ANNs 814-2 by the workload estimation circuitry. The maintenance operations can be, but are not limited to, a quantity of maintenance operations to be performed or a description of specific maintenance operations to perform.

In one embodiment, each variable used by the ANNs 814-2 as inputs to calculate maintenance operations as outputs may be fed into the ANNs 814-2 via individual input nodes 824. For example, the total outstanding media scan operations 861 may be uploaded to the ANNs 814-2 from the workload estimation circuitry via input node 824-10. The total temperature remediation operations 851 to be performed on the memory device may be uploaded to the ANNs 814-2 from the workload estimation circuitry via input node 824-9. The free block pool size 846 of the memory device may be uploaded to the ANNs 814-2 from the workload estimation circuitry via input node 824-6. The amount of wear leveling operations 841 required for the memory device may be uploaded to the ANNs 814-2 from the workload estimation circuitry via input node 824-1. The predicted power down time 845 of the subsequent power down event may be uploaded to the ANNs 814-2 from the workload estimation circuitry via input node 824-2. The logical saturation 842 of the memory device may be uploaded to the ANNs 814-2 from the workload estimation circuitry via input node 824-3. The device geometry 843 of the memory device may be uploaded to the ANNs 814-2 from the workload estimation circuitry via input node 824-4. The time since the last power down event 844 of the memory device may be uploaded to the ANNs 814-2 from the workload estimation circuitry via input node 824-5. The amount of time soaking at high temperatures 848 of the memory device may be uploaded to the ANNs 814-2 from the workload estimation circuitry via input node 824-8. The average temperature 847 of the memory device may be uploaded to the ANNs 814-2 from the workload estimation circuitry via input node 824-7. The amount of host traffic 871 since the last power down event to the memory device may be uploaded to the ANNs 814-2 from the workload estimation circuitry via input node 824-11.

In one embodiment, the various inputs that were uploaded to the ANNs 814-2 via input nodes 824 are then directed to internal nodes 825 of the ANNs 814-2. The internal nodes 825 calculate the amount of maintenance operations to be performed on the memory device prior to the subsequent power down event. Each maintenance operation to be performed is directed to the workload estimation circuitry via output nodes 826. For example, Output node 826-3 may export the temperature remediation operations 850 to be perform on the memory device from the ANNs 814-2 to the workload estimation circuitry. Output node 826-5 may export the garbage collection operations 870 to be perform on the memory device from the ANNs 814-2 to the workload estimation circuitry. Export node 826-1 may export the wear leveling operations 840 to be performed on the memory device from the ANNs 814-2 to the workload estimation circuitry. Export node 826-4 may export the media scan operations 860 to be performed on the memory device from the ANNs 814-2 to the workload estimation circuitry. Export node 826-2 may export the predicted power down time 845 of the memory device from the ANNs 814-2 to the workload estimation circuitry.

Figure 9:
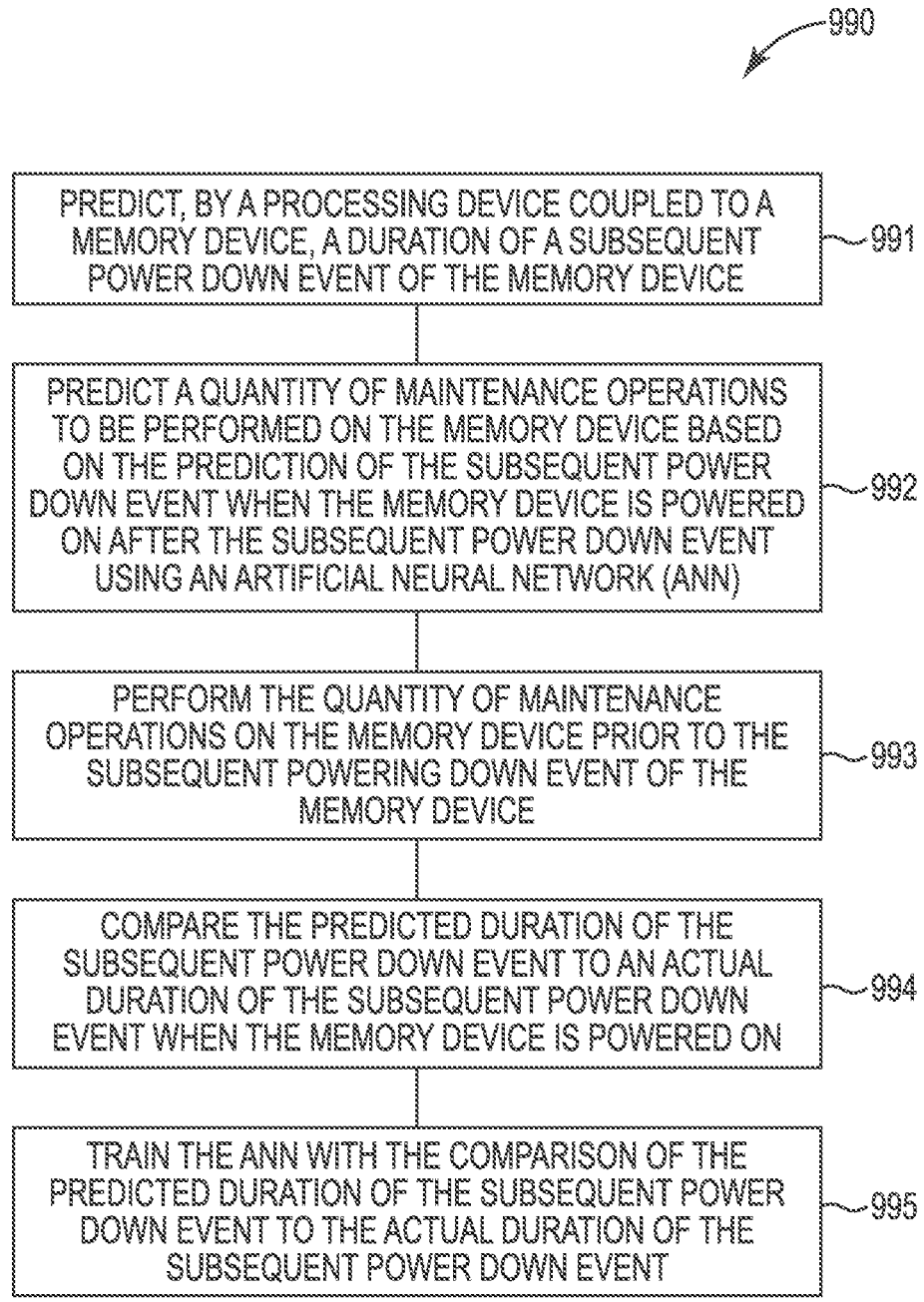
FIG. 9 illustrates an example flow diagram of a method for predicting workload operations in accordance with a number of embodiments of the present disclosure.

FIG. 9 illustrates an example flow diagram of a method 990 for predicting workload operations in accordance with a number of embodiments of the present disclosure. The method 990 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 990 is performed by the control circuitry (e.g., controller) 116 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 991, a prediction of a duration of a subsequent power down event of the memory device can be made by a processing device coupled to a memory device. The processing device coupled to the memory device may be resident on a memory sub-system. The memory sub-system may be connected to a host device or a cloud system via a network. At operation 992, a prediction can be made using an ANNs of a quantity of maintenance operations to be performed on the memory device based on the prediction of the subsequent power down event when the memory device is powered on after the subsequent power down event. The prediction of the quantity of maintenance operations may also be based on, in addition to the predicted subsequent power down event duration, varying inputs provided to the ANNs from a workload estimation circuitry. At operation 993, the quantity of maintenance operations can be performed on the memory device prior to the subsequent powering down event of the memory device. The operations may be performed by, but not limited to, the memory sub-system controller or a processing device embedded within the sub-system. At operation 994, the predicted power duration of the subsequent power down event can be compared to an actual duration of the subsequent power down event when the memory device is powered on. The comparison can be made by the workload estimation circuitry, the memory sub-system controller, or a processing component embedded in the memory sub-system controller. At operation 995, the ANNs can be trained with the comparison of the predicted duration of the subsequent power down event to the actual duration of the subsequent power down event. The training may consist of updating the weights and biases of the ANNs. The maintenance operations can include, for example, temperature remediation operations, garbage collection operations, wear leveling operations, and media scan operations.

The method 990 can also include predicting the quantity of maintenance operations to be perform by providing an average temperature of the memory device and an amount of time soaking at high temperatures of the memory device to the ANNs as inputs, and the output of the ANNs is an amount of temperature remediation operations to perform prior to the power down event of the memory device. Predict the quantity of maintenance operations to be performed by providing a last power down time duration of the memory, a free block pool size of the memory device, and an amount of host traffic since the previous power down event of the memory device to the ANNs as inputs, and the output of the ANNs is the quantity of garbage collection operations to perform on the memory device prior to the power down event. The ANNs may order the performance of the quantity of maintenance operations to be performed so that a user experiences minimal interference with the use of the memory device when powered on.

In a number of examples, a prediction of a duration of a subsequent power down event of a memory device can be made. An ANNs can make a further prediction of a quantity of maintenance operations to be perform on the memory device based on the predicted duration of the subsequent power down event when the memory device is power on after the subsequent power down event. The quantity of maintenance operations can then be performed on the memory device prior to the subsequent power down event of the memory device. Based on the file metadata and the device metadata, a number of indicators can be selected to provide an indication of an expected use of the data file in the memory device. The number of indicators can be provided to the memory device. The memory device can receive the data file and the number of indicators and store the data file with different data files having matching indicators corresponding thereto. The memory device can perform a garbage collection operation on the data file and the different data files.

In an additional example, the predicted duration of the subsequent power down event of the memory device can be compared to an actual duration of the subsequent power down event of the memory device. The comparison can then be used to train the ANNs. A different ANN (e.g., ANN 114-1 in FIG. 1) may be utilized to predict the duration of the subsequent power down event of the memory device than the ANN (e.g., ANN 114-2 in FIG. 1) used to predict the quantity of maintenance operations to be performed. The ANN may use a long short-term memory (LSTM) network architecture to predict the quantity of maintenance operations to perform on the memory device. The ANNs may be trained at run-time utilizing a plurality of previous power-down durations. The ANN may also be trained by the manufacturer of the memory device. The ANNs can use a logical saturation level of the memory device as an input and provide a quantity of wear leveling operations to perform prior to the power down event and the predicted power down time as an output.

In various embodiment, a prediction of a duration of a subsequent power down event of a memory device may be made by a first ANN. A second ANN may predict a plurality of different types of maintenance operations to be performed on the memory device based on the predicted duration of the subsequent power down event when the memory device is powered on after the subsequent power down event. The plurality of different types of maintenance operations on the memory device may be performed prior to the subsequent power down event.

The plurality of different types of maintenance operations to be performed may include a quantity of media scan operations. The device geometry of the memory device and a time since a previous power down event of the memory device may be proved to the second ANN as an input. The second ANN may then provide the quantity of media scan operations to perform prior to the power down event as an output. The second ANN may be updated by a cloud system utilizing weights and biases.

Figure 10:
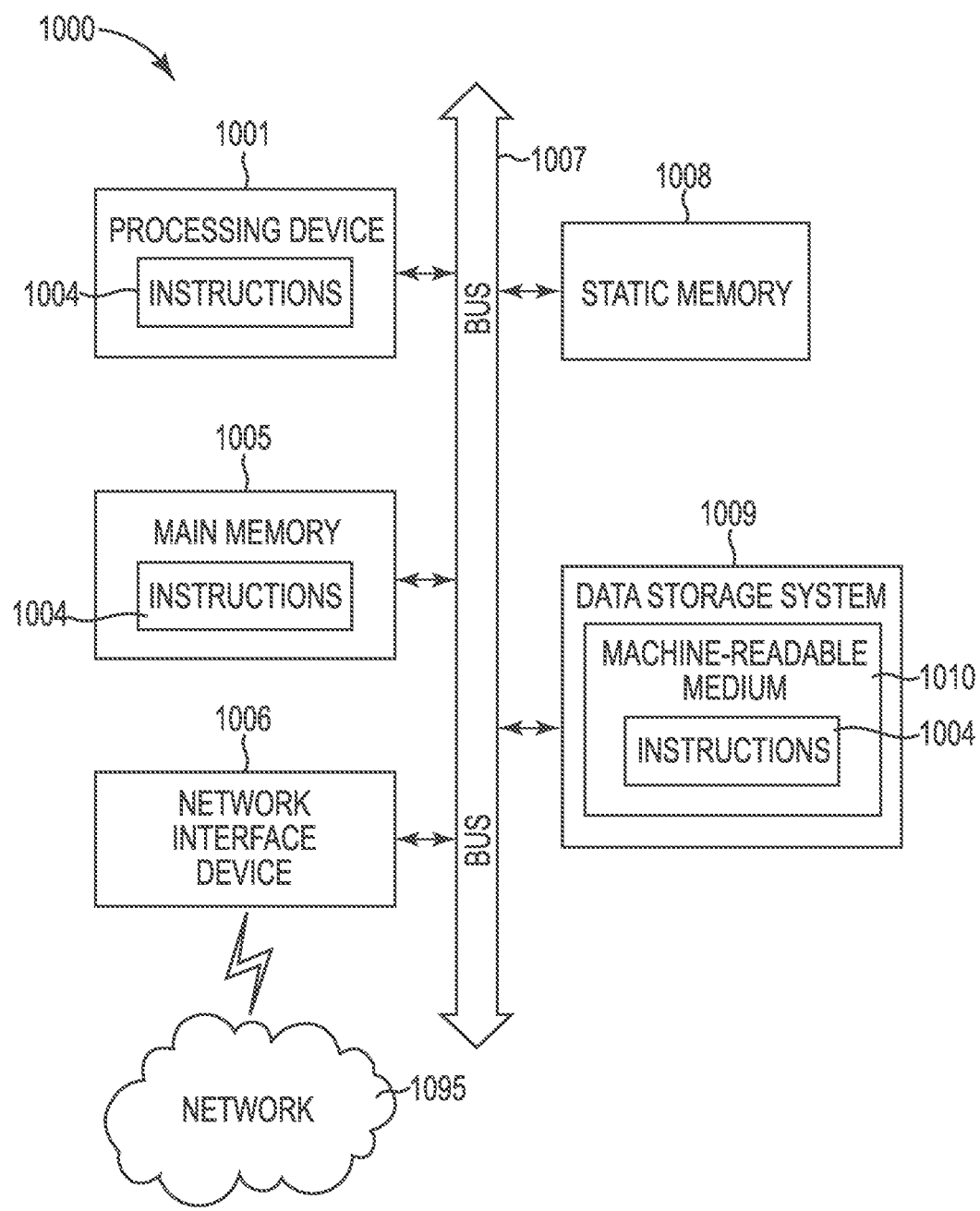
FIG. 10 illustrates an example machine of a computer system within which a set of instructions, for causing the machine to perform various methodologies discussed herein, can be executed.

FIG. 10 illustrates an example machine of a computer system 1000 within which a set of instructions, for causing the machine to perform various methodologies discussed herein, can be executed. In various embodiments, the computer system 1000 can correspond to a system (e.g., the computing system 100 of FIG. 1) that includes, is coupled to, or utilizes a memory sub-system (e.g., the memory sub-system 115 of FIG. 1) or can be used to perform the operations of a controller (e.g., the controller 116 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1001, a main memory 1005 (e.g., read-only memory (ROM), flash memory, dynamic random access memory (DRAM) such as synchronous DRAM (SDRAM) or Rambus DRAM (RDRAM), etc.), a static memory 1008 (e.g., flash memory, static random access memory (SRAM), etc.), and a data storage system 1009, which communicate with each other via a bus 1007.

Processing device 1001 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1001 can also be one or more special-purpose processing devices such as an application specific integrated circuit (ASIC), a field programmable gate array (FPGA), a digital signal processor (DSP), network processor, or the like. The processing device 1001 is configured to execute instructions 1004 for performing the operations and steps discussed herein. The computer system 1000 can further include a network interface device 1006 to communicate over the network 1095.

The data storage system 1009 can include a machine-readable storage medium 1010 (also known as a computer-readable medium) on which is stored one or more sets of instructions 1004 or software embodying any one or more of the methodologies or functions described herein. The instructions 1004 can also reside, completely or at least partially, within the main memory 1005 and/or within the processing device 1001 during execution thereof by the computer system 1000, the main memory 1005 and the processing device 1001 also constituting machine-readable storage media.

In one embodiment, the instructions 1004 include instructions to implement functionality corresponding to the host 102 and/or the memory sub-system 115 of FIG. 1. While the machine-readable storage medium 1010 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As used herein, "a number of" something can refer to one or more of such things. For example, a number of memory devices can refer to one or more memory devices. A "plurality" of something intends two or more. Additionally, designators such as "N," as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   a memory device;
   a processing device coupled to the memory device and configured to:
   predict a duration of a subsequent power down event of the memory device;
   predict a quantity of maintenance operations to be performed on the memory device based on the predicted duration of the subsequent power down event when the memory device is powered on after the subsequent power down event using an artificial neural network (ANN); and
   perform the quantity of maintenance operations on the memory device prior to the subsequent powering down event of the memory device.

2. The apparatus of claim 1, wherein the processing device is further configured to compare the predicted duration of the subsequent power down event of the memory device to an actual duration of the subsequent power down event of the memory device.

3. The apparatus of claim 2, wherein the processing device is further configured to train the ANN based on the comparison for future predictions of durations of subsequent power down events of the memory device.

4. The apparatus of claim 1, wherein the processing device is further configured to predict the duration of the subsequent power down event of the memory device utilizing a different ANN.

5. The apparatus of claim 1, wherein the processing device is further configured to predict the quantity of maintenance operations using the ANN comprising a long short-term memory (LSTM) network architecture.

6. The apparatus of claim 1, wherein the processing device is further configured to train the ANN at run-time utilizing a plurality of previous power down durations.

7. The apparatus of claim 1, wherein the ANN is trained by a manufacturer of the memory device.

8. The apparatus of claim 1, wherein the processing device configured to perform the quantity of maintenance operations is further configured to perform wear leveling operations.

9. The apparatus of claim 8, wherein the processing device is further configured to:
   provide a logical saturation level of the memory device as an input to the ANN; and
   receive a quantity of wear leveling operations to perform prior to the power down event and a predicted power down time from the ANN.

10. A method, comprising:
    predicting, by a processing device coupled to a memory device, a duration of a subsequent power down event of the memory device;
    predicting a quantity of maintenance operations to be performed on the memory device based on the predicted duration of the subsequent power down event when the memory device is powered on after the subsequent power down event using an artificial neural network (ANN);
    performing the quantity of maintenance operations on the memory device prior to the subsequent powering down event of the memory device;
    comparing the predicted duration of the subsequent power down event to an actual duration of the subsequent power down event when the memory device is powered on; and
    training the ANN with the comparison of the predicted duration of the subsequent power down event to the actual duration of the subsequent power down event.

11. The method of claim 10, wherein performing the quantity of maintenance operations further comprises performing a quantity of temperature remediation operations.

12. The method of claim 11, wherein predicting of the quantity of maintenance operations to be performed further comprises:
    providing an average temperature of the memory device and an amount of time soaking at high temperatures of the memory device to the ANN as inputs; and
    receiving an amount of temperature remediation operations to perform prior to the power down event from the ANN.

13. The method of claim 10, wherein performing the quantity of maintenance operations further comprises performing a quantity of garbage collection operations.

14. The method of claim 13, wherein predicting of the quantity of maintenance operations to be performed further comprises:
providing a last power down time duration of the memory device, a free block pool size of the memory device, and an amount of a host traffic since the previous power down event of the memory device to the ANN as inputs; and
receiving the quantity of garbage collection operations to perform prior to the power down event from the ANN.

15. The method of claim 10, further comprising ordering the quantity of maintenance operations to be performed so that a user experiences minimal interference with use of the memory device when powered on.

16. A system, comprising:
a memory device;
a first artificial neural network (ANN) configured to predict a duration of a subsequent power down event of the memory device;
a second ANN configured to predict a plurality of different types of maintenance operations to be performed on the memory device based on the predicted duration of the subsequent power down event when the memory device is powered on after the subsequent power down event using the first ANN; and
a processing device coupled to the first ANN and the second ANN and configured to perform the plurality of different types of maintenance operations on the memory device prior to the subsequent powering down event of the memory device.

17. The system of claim 16, wherein the processing device configured to perform the plurality of different types of maintenance operations is further configured to perform a quantity of media scan operations.

18. The system of claim 17, wherein the processing device is further configured to:
provide device geometry of the memory device and a time since a previous power down event of the memory device to the second ANN as an input; and
receive the quantity of media scan operations to perform prior to the power down event from the second ANN.

19. The system of claim 16, wherein the processing device is further configured to update the second ANN utilizing weights and biases received from a cloud system.

20. The system of claim 16, wherein the processing device, the first ANN, and the second ANN are resident on a mobile computing device.

* * * * *